US005200242A

United States Patent [19]

[11] Patent Number: 5,200,242

[45] Date of Patent: Apr. 6, 1993

Hohmann

[54] INK JET TRANSPARENCY WITH EXTENDED PAPER BACKING

[75] Inventor: Christopher J. Hohmann, West Warwick, R.I.

[73] Assignee: Arkwright, Inc., Fiskeville, R.I.

[21] Appl. No.: 461,837

[22] Filed: Jan. 9, 1990

[51] Int. Cl.$^{5}$ .......................... B41M 5/00; B32B 3/00

[52] U.S. Cl. ........................................ 428/40; 428/41; 428/43; 428/192; 428/194; 428/138; 428/136; 428/211; 428/198; 428/202; 428/220; 428/201; 428/337.1; 428/203; 428/195; 428/913; 346/135.1

[58] Field of Search ..................... 428/40, 41, 43, 192, 428/194, 138, 136, 211, 198, 202, 220, 537.1, 203, 195, 913; 346/135.1

[56] References Cited

U.S. PATENT DOCUMENTS

| | | | |
|---|---|---|---|
| 1,261,516 | 4/1918 | Haddock | 428/43 X |
| 3,618,652 | 11/1971 | Barker et al. | 206/57 |
| 4,051,285 | 9/1977 | Kramer | 428/43 |
| 4,268,566 | 5/1981 | Ebert | 428/211 X |
| 4,447,481 | 5/1984 | Holmberg et al. | 428/40 |
| 4,568,108 | 2/1986 | Simpson | 281/5 |
| 4,578,285 | 3/1986 | Viola | 346/1.1 X |
| 4,592,954 | 6/1986 | Malhotra | 428/195 X |
| 4,765,654 | 8/1988 | Nakamura | 283/67 |
| 4,810,006 | 3/1989 | Katz | 281/5 |
| 4,814,216 | 3/1989 | Brunett et al. | 428/43 |
| 4,857,386 | 8/1989 | Butters et al. | 438/211 X |
| 4,873,135 | 10/1989 | Wittnebel et al. | 428/192 |
| 4,910,188 | 3/1990 | Akuda et al. | 428/40 |
| 4,925,716 | 5/1990 | Haas | 428/43 X |
| 4,931,334 | 6/1990 | Shiozawa et al. | 428/211 X |
| 4,946,728 | 8/1990 | Ikeda et al. | 428/211 X |
| 4,961,811 | 10/1990 | Haugwitz | 428/211 X |
| 4,980,212 | 12/1990 | Marquis et al. | 428/43 X |

FOREIGN PATENT DOCUMENTS

| | | |
|---|---|---|
| 0198636 | 10/1986 | European Pat. Off. . |
| 0294155 | 12/1988 | European Pat. Off. . |

*Primary Examiner*—Ellis P. Robinson
*Assistant Examiner*—William P. Watkins, III
*Attorney, Agent, or Firm*—Birch, Stewart, Kolasch & Birch

[57] ABSTRACT

A receptor sheet composite is provided for use in sheet fed electronic printers or the like which eliminates blanking or lost imaging area of a leading edge of image being formed on a transparency. The composite includes an oversized paper backing and a film adhesively secured to the paper backing and with a perforation line for easy removal. The excess length of the oversized composite compensates for the lead edge blanking which occurs in some prior art imaging of film sheets.

3 Claims, 4 Drawing Sheets

INK JET TRANSPARENCY WITH EXTENDED PAPER BACKING

BACKGROUND OF THE INVENTION

1. Field of the Invention

The present invention relates to a receptor sheet composite for use in sheet fed electronic printers. More particularly, the present invention relates to a receptor sheet composite for a sheet fed ink jet printer which enables the image printed by the imaging apparatus to utilize the maximum imaging boundaries possible on a selected size of transparency film formed in the receptor sheet composite.

2. Description of Related Art

A problem exists in the art of imaging onto transparency film or the like in apparatuses such as sheet fed ink jet printers, for example the Hewlett Packard Paint Jet Printer, whereby the image formed on the transparency will not begin for approximately one (1) inch from the top or entry edge of the transparency, thereby resulting in less than the standard imaging area.

Moreover, an unsupported film does not provide an easily identified image side, is not easily readable and is often prone to scratching.

To resolve the above noted failings requires a unique composite of film and paper, suitably matched, dimensioned and configured.

An example of a type of transparency for use with ink jet printers and the like is described in European Patent Application 0 294 155 published on Dec. 7, 1988. The receptor sheet composite of the present invention is intended as a significant improvement thereover as a means of producing a standard imaging area of a transparency without requiring unacceptable transparency sizes or significantly altering present printer constructions or designs.

Accordingly, a need in the art exists for a receptor sheet composite which provides the standard imaging area on a transparency, the advantages of a backing sheet and which is easy to use, and does not require significant modification of existing equipment.

SUMMARY OF THE INVENTION

Accordingly, it is a primary object of the present invention to provide a receptor sheet composite for use in sheet fed electronic printers which incorporate a lead edge design for compensating for a blank or non-imagable space normally formed at the entry edge of a transparency or document when printing an image thereon.

It is another object of the present invention to provide a receptor sheet composite with an advantageous leading edge design which can be used in existing sheet fed ink jet printers such as the Hewlett Packard Paint Jet Printer without significantly modifying the printing equipment or program software. It is a further objective of this invention to provide the advantages of a backing sheet.

The objects of the present invention are fulfilled by providing a receptor sheet composite for use in a printing apparatus comprising:

- an oversized paper backing, said paper backing including a leading edge design comprised of a leading edge zone;
- a transparency film overlaying said paper backing for receiving an image when used in said printing apparatus, said transparency including a leading edge design comprised of a leading edge zone;
- means for securing the leading edge zone of said transparency within the leading edge zone of said paper backing; and
- means for enabling removal of said transparency from the leading edge zone thereof and from said paper backing;
- said leading edge zones being defined as a predetermined widthwise end portion area of said film and said paper backing which is in excess of the standard size and is not imagable in a printing operation.

Various adhesive types and placements are possible in adhering the paper to the film. Further, while the paper backing must necessarily be oversized, the film, including the defined leading edge zone thereof, may be shorter than or equal in length to the paper backing.

Further, the film may be slit or perforated across a widthwise end portion at the border of the leading edge zone to enable removal of the standard side transparency portion of the film from its leading edge zone and from the backing sheet at a predetermined delineation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Further scope of applicability o the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF PREFERRED EMBODIMENTS

The following are brief definitions of elements shown and described in connection with the present invention:

1. Leading Edge design indicates the format and configuration.
2. Entry edge indicates the portion of the sheet that makes first entry into the printer.
3. Leading Edge Zone indicates that portion in excess of the standard sheet size.
4. Standard Sheet Size in the United States is 8½"×11" in dimension.
5. Transparency refers to the imagable portion of the film namely the 8½"×11" size.
6. Leading Edge Zone of the film is the throw away portion of the film, the transparency is the usable portion.
7. Film refers to the entire film sheet in the composite, i.e. either the transparency alone or the transparency plus the leading edge zone.
8. Blanking refers to the non-imagable area of the leading edge zone.

Figure 1:
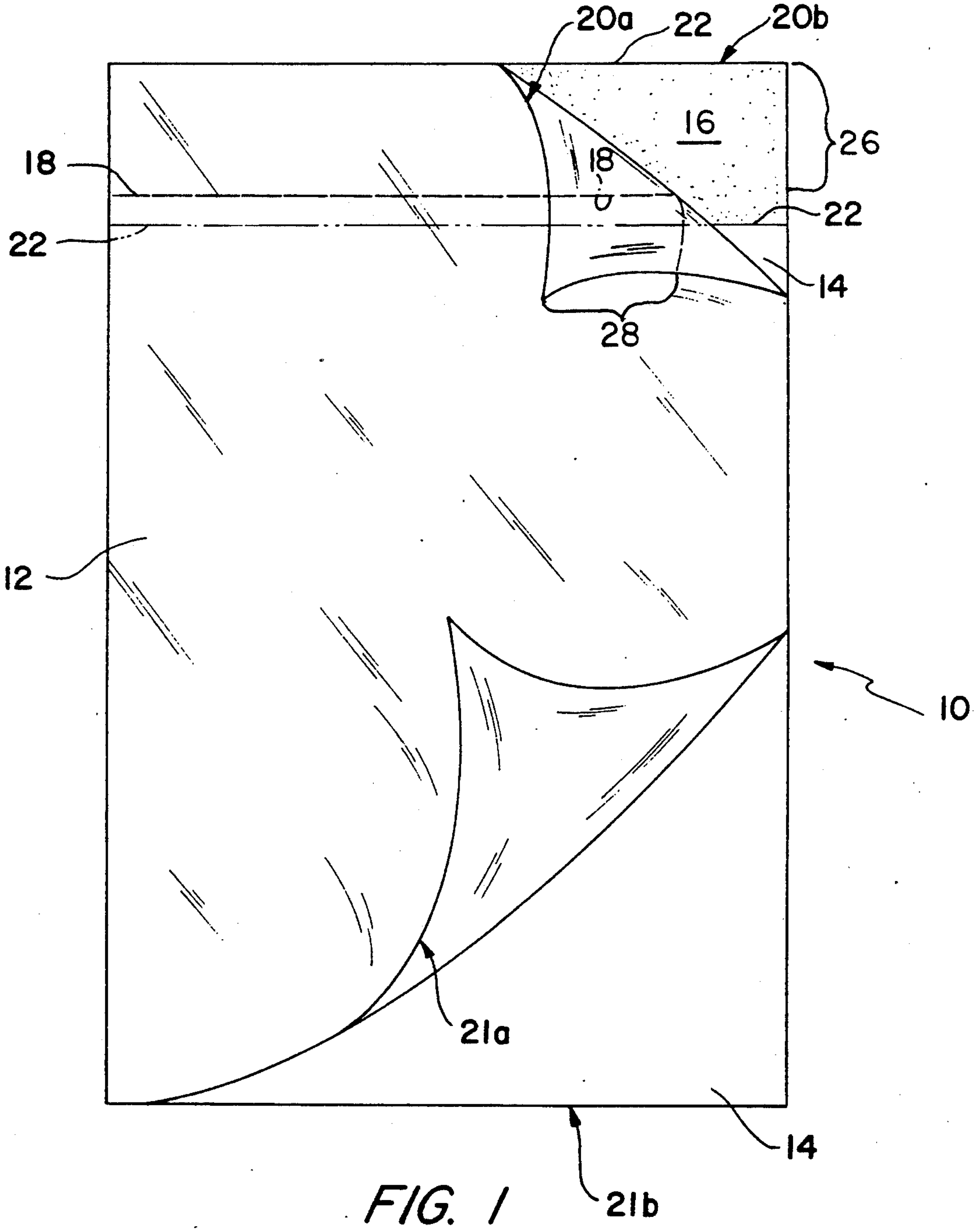
FIG. 1 is a plan view showing a preferred embodiment of the present invention in which a transparency and paper backing are of identical dimensions.

Referring to FIG. 1, there is generally indicated a receptor sheet composite 10. Included in the receptor sheet composite 10 is a paper backing 14 and a transparency film 12 secured to the paper backing 14 with adhesive 16.

Each of the paper backing 14 and transparency film 12 have a leading edge and a trailing edge. For convenience, the leading and trailing edges of the paper backing 14 are shown as 20*b* and 21*b*, respectively, while the leading and trailing edges of the transparency film 12 are shown as 20*a* and 21*a*, respectively.

The provision of a leading edge on the paper backing is especially significant, in that the leading edge 20*b* thereof acts as a deception to an imaging system in a sheet fed ink jet printer or similar copying device to enable printing of an image on the maximum possible dimensions of the transparency film 12. While the leading edge of the paper backing 14 is indicated as beginning at edge 20*b*, it should be understood that there is in fact a leading edge "zone" 26 in all of the embodiments shown which extends the entire width of the paper backing 14 and one (1) inch deep from the leading edge 20*b* down the lengthwise dimension of the paper backing 14.

Similarly, the leading edge of the transparency is indicated as beginning at 20*a*, but unlike the paper backing 14, the area of the leading edge "zone" of the transparency 12 will vary throughout the embodiments shown. In any event, the transparency 12 in FIG. 1 has a leading edge zone 28 which completely overlaps the leading edge zone 26 of the paper backing 14.

Continuing with reference to FIG. 1, an adhesive 16 is shown applied to an area greater than the leading edge zone 26 of paper backing 14 having upper and lower adhesive boundaries 22. Alternatively, the upper adhesive boundary may be short of the leading edge of the paper 20*b*.

The transparency film 12 of FIG. 1 includes a perforation or slit formed in the film at 18. This perforation, slit or delineation in the transparency 12 enables removal of the transparency 12 from the leading edge zone 28 of the transparency. In the embodiment shown, at least a portion of the transparency 12 is secured to the adhesive 16 such that the perforation 18 is positioned across a widthwise end portion of the paper backing 14 and through the adhesive 16. By this arrangement, removal of the transparency 12 from the leading edge zone 28 thereof at the perforation 18 will cause the leading edge zone 28 to remain secured to the adhesive 16 formed on the paper backing 14. The transparency 12 with an image (not shown) formed thereon will then be freely useable without the paper backing secured thereto.

Figure 2:
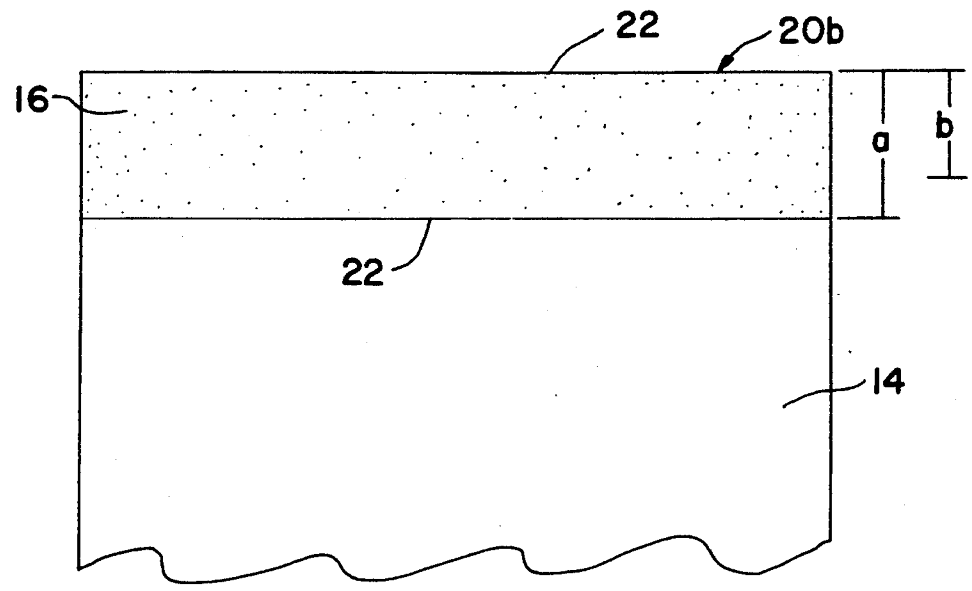
FIG. 2 is a plan view showing the paper backing of FIG. 1 including a leading edge zone thereof having adhesive formed thereon.
Figure 3:
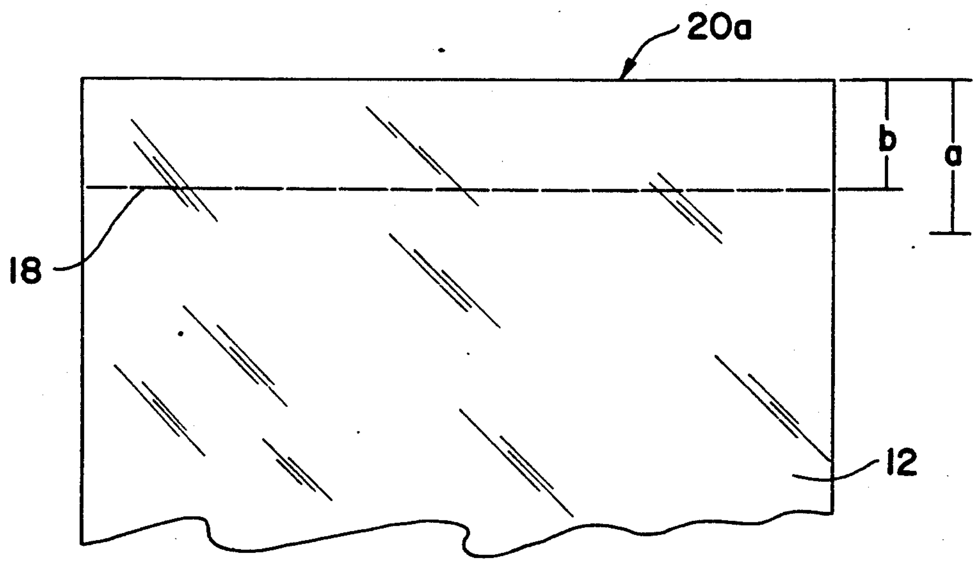
FIG. 3 is a plan view showing the transparency including a leading edge zone thereof which overlays the paper backing of FIG. 2 to form the composite of FIG. 1.

FIGS. 2 and 3 show the relative relationship of adhesive 16 formed on the paper backing to the perforation 18 formed in the transparency 12. A dimension "b" represents the distance from the leading edge 20*a* of the transparency to the perforation 18 formed in the transparency and dimension a represents the distance from the leading edge 20*b* of the paper backing 14 to the edge 22 of the adhesive 16. When FIGS. 2 and 3 are superimposed, the relationship of the adhesive 16 to the perforation 18 can be clearly seen with the distance b to the perforation 18 being less than the distance a to the edge 22 of the adhesive 16.

Selection of adhesive 16 is critical to the simplicity and effective functioning of the instant invention. In particular, the adhesive must be selected to match the requirements of processing, bonding and removability. An example of an effective adhesive are the natural rubbers manufactured by National Starch and Nacon of Toronto, Canada. The adhesive coating may be applied by conventional techniques including but not limited to extrusion and roller coating. A "peel-strength" of the final adhesive product must be adequate to allow reliable feeding in ink jet printers or the like, yet be of the removable adhesive variety to enable clean and easy removal of the transparency 12 from the paper backing 14 without a residue remaining on the transparency film 12.

In other words, there will preferably be only a negligible residue of adhesive or paper on the transparency 12 when the transparency is removed from the paper backing 14. Such a residue would be objectionable if left on the transparency 12 since it would become stuck to the glass surface of an overhead projector due to the heat generated by the projector and distractingly project.

Briefly, selection of the paper backing 14 should match the requirements of processing, removability, and contact stability. The paper backing 14 should be strong enough to process in conventional coating equipment and easily accept the adhesive coating 16. The paper backing 14 should be stable when in contact with the transparency film 12 during shipping and storage and should be compatible for use with conventional feeding mechanisms of existing printers. An acceptable paper will further be that which will not cause objectionable transfer of paper fiber or fillers when transparencies are produced in a continuous mode where image contact with packing paper may occur for finite intervals.

Finally, the combining of composite webs is accomplished by means of conventional coating and web-handling equipment. Precision cutting to size is done either in-line or by separate off-line conventional cutting equipment.

Figure 4:
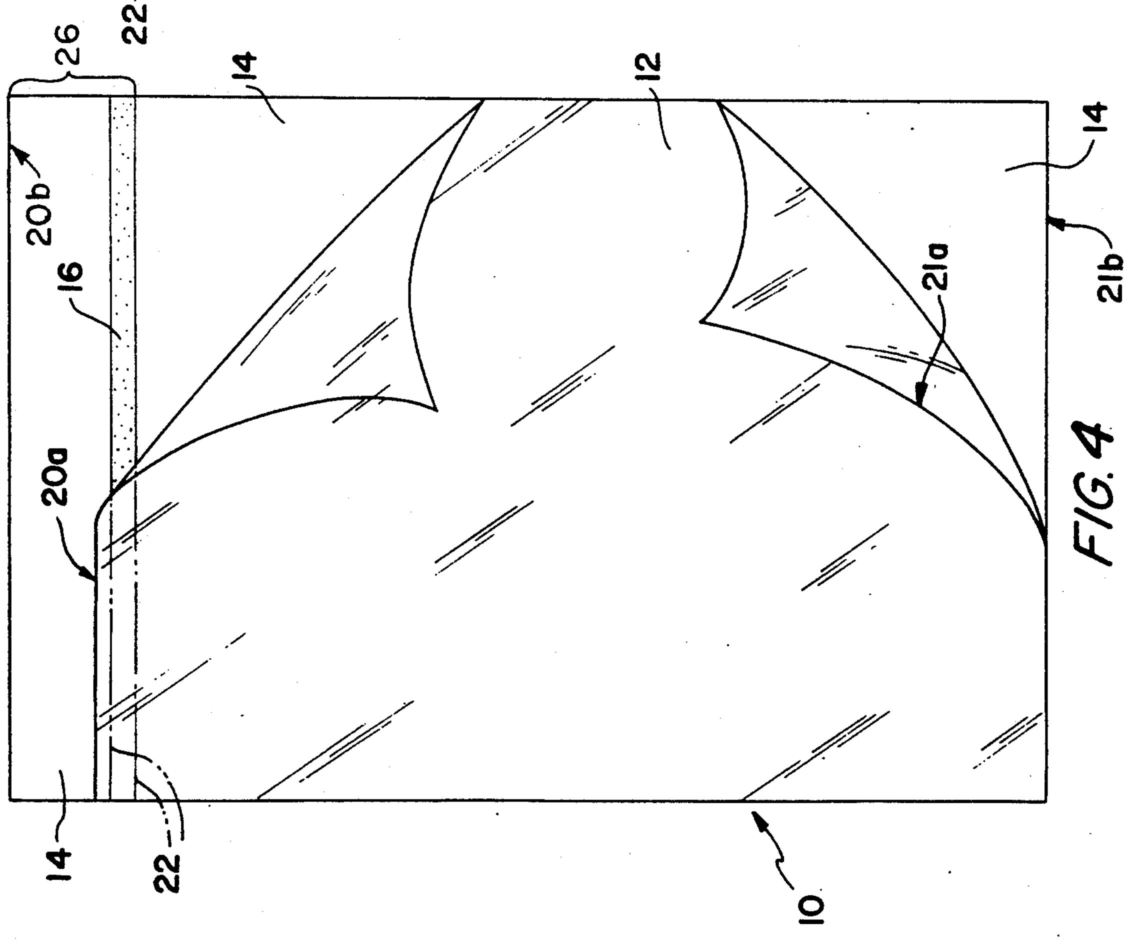
FIG. 4 is a plan view showing a second embodiment of the present invention in which the transparency is shorter in length than the paper backing.

FIG. 4 is a plan view showing a second embodiment of the present invention in which the transparency film 12 is shorter in length than the paper backing 14. There are no perforations provided in either of the transparency film 12 or the paper backing 14. Instead, the transparency film 12 is secured near the leading edge 20*a* thereof to a narrow adhesive band 16 formed on the paper backing 14. By this arrangement, a transparency film 12 closer in length to a final imaged transparency product is possible without sacrificing imaging area on the transparency film 12. The narrow strip of adhesive 16 is applied so that it will secure the transparency film 12 to the paper backing 14 without any adhesive extending beyond the transparency film 12. If a wider band of adhesive 16 were used extending further into the zone, subsequent sheets of paper backing would become stuck together and sheet composites would be difficult to separate for feeding into the printer.

Figure 5:
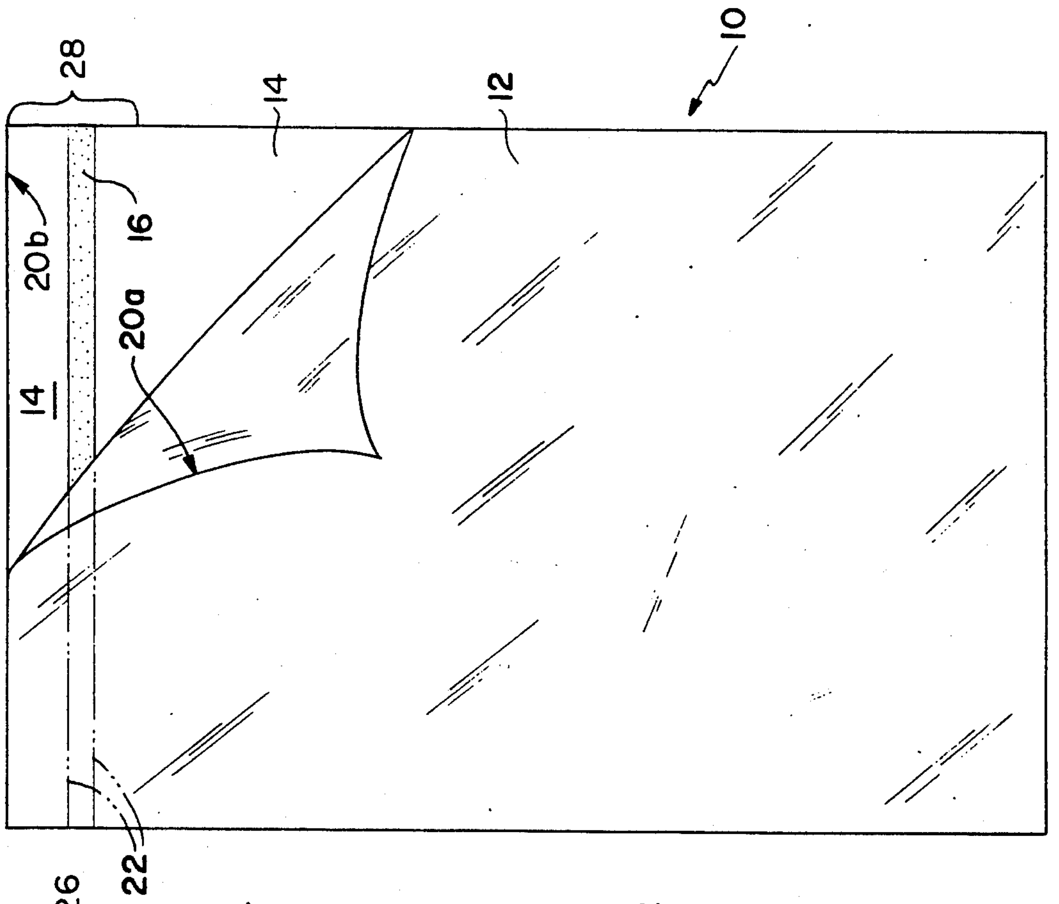
FIG. 5 is a plan view showing a third embodiment of the present invention in which the transparency and paper backing are of identical dimensions and wherein an adhesive is formed as a narrow band on a first predetermined location of the paper backing.

FIG. 5 is a plan view showing still another embodiment of the present invention in which the transparency film 12 is the same length as the paper backing 14. A narrow band of adhesive 16 is again employed, but it can be seen that any appropriate and desirable placement of the narrow band of adhesive 16 is now possible due to the increased length of the transparency film 12. The placement of the narrow band of adhesive 16 should not, however, be positioned lower than one inch from the uppermost leading edge 20*b* or outside the leading edge zone 26 of the paper backing 14. To otherwise position the adhesive 16 would detrimentally interfere with imaging onto the transparency film 12.

Figure 6:
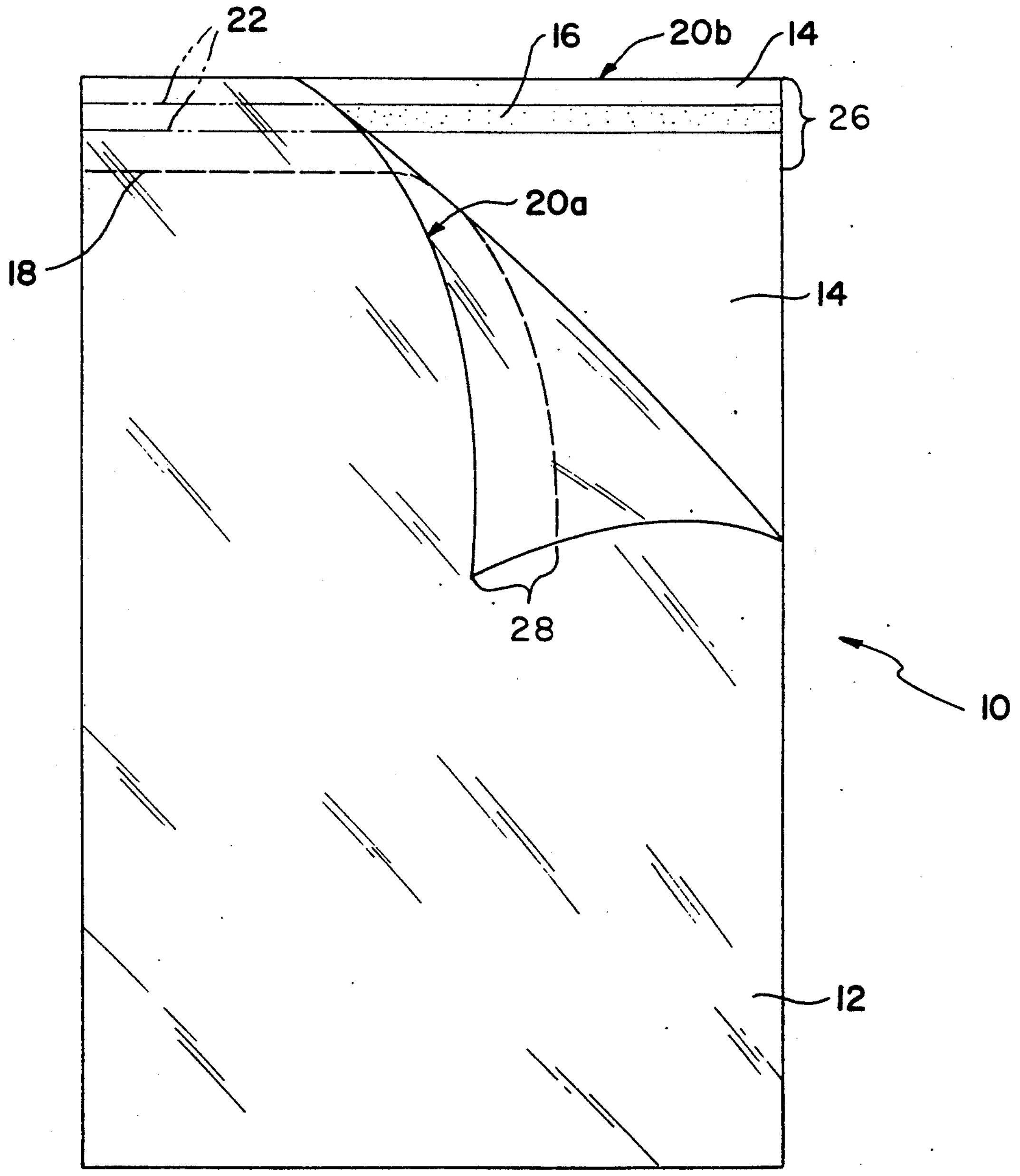
FIG. 6 is a plan view showing a fourth embodiment of the present invention in which the transparency and paper backing are also of identical dimensions and wherein the adhesive is formed as a narrow band in a second predetermined location of the paper backing.

FIG. 6 is a plan view showing a fourth embodiment of the present invention. As illustrated therein, the transparency film 12 is the same length as the paper backing 14. The embodiment of FIG. 6 differs from that of FIG. 5 only by the inclusion of a perforation 18 in the transparency film 12. Similar to the embodiment of FIG. 5, the narrow band of adhesive 16 may be advantageously placed anywhere within the leading edge zone 26 of the paper backing 14 so long as a widthwise leading end portion 20*a* of the transparency film 12 is in complete contact therewith. By this arrangement, the transparency film 12 may be detached from the leading edge zone 28 thereof while the leading edge zone remains secured to the paper backing 14 via the narrow band of adhesive 16.

Hereinabove, the paper backing 14 has been referred to as "oversized". It should be noted, however, that the present invention is particularly designed for use with imaged transparencies of 8.5×11 inches in dimension. Thus, the paper backing 14 should preferrably 12 inches in length or 1 inch longer than the standard 11 inch length. The length of either the paper backing 14 or transparency film 12 could be between 11.25 inch and 13 inches, and possibly longer. The perforation 18 in the transparency film 12 is preferrably at the 11 inch mark although a slightly higher or lower perforation is tolerable. It should be kept in mind that the intention is to arrive at a transparency which can be easily used on all existing overhead projectors. The normal size transparency in the United States is 8.5×11 inches and 210×297 mm (A4) in Europe. The width of each of the transparency film 12 and paper backing 14 is preferrably 8.5 inches, although a slightly wider or narrower width may be tolerated. For Europe and various other countries, an A4 size may be considered standard, and dimensions of the transparency film 12, paper backing 14, as well as placement of adhesive 16, perforation 18 and perforation 24 should be adjusted accordingly.

Thus, the present invention provides for a resulting transparency film 12 having a full 11 inches of length for receiving an image. Without the leading edge zones in excess of the 11 inches, there would be an undesirable loss in imaging area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A receptor sheet composite for use in a sheet fed ink jet printer comprising:

a paper backing, said paper backing including a leading edge zone;

a transparency film overlaying said backing for receiving an image when used in said imaging apparatus, said transparency film including a leading edge zone of about one inch in length and an image-receiving area of eight and one-half by eleven inches or 210 by 297 mm in overall dimension;

slits or perforations formed across a widthwise end portion of said transparency film at a boundary of the leading edge zone and separating the leading edge zone of said transparency film from said image-receiving area, whereby said image-receiving area of said transparency film is removable from the leading edge zone thereof at the delineation;

means for securing said transparency film to said paper backing, said means for securing being comprised of adhesive applied to at least a portion of the leading edge zone of said paper backing and to an area of said paper backing extending below the leading edge zone thereof and below said slits or perforations said adhesive being a removable adhesive which permits removal of said transparency film from said paper backing without leaving a residue remaining on said transparent film;

said leading edge zone being defined as a predetermined widthwise end portion area of said transparency film and said paper backing which is not intended for imaging in a printing operation, whereby said transparency is able to receive an image over the entire length of said image-receiving area.

2. The receptor composite sheet according to claim 1, wherein each of said paper backing and said transparency film are of identical lengthwise and widthwise dimensions.

3. The receptor composite sheet according to claim 1, wherein said paper backing has a lengthwise dimension greater than a lengthwise dimension of said transparency film.

* * * * *